United States Patent
Leigh et al.

(10) Patent No.: US 8,037,223 B2
(45) Date of Patent: Oct. 11, 2011

(54) RECONFIGURABLE I/O CARD PINS

(75) Inventors: Kevin B. Leigh, Houston, TX (US);
John D. Nguyen, Cypress, TX (US);
James R. Duncan, Houston, TX (US);
Binh Nguyen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 475 days.

(21) Appl. No.: 11/818,204

(22) Filed: Jun. 13, 2007

(65) Prior Publication Data
US 2008/0313381 A1   Dec. 18, 2008

(51) Int. Cl.
*G06F 13/12* (2006.01)
*G06F 13/38* (2006.01)

(52) U.S. Cl. ............................. 710/62; 710/313; 713/100
(58) Field of Classification Search .................. 710/314, 710/312
See application file for complete search history.

(56) References Cited

U.S. PATENT DOCUMENTS

| | | | |
|---|---|---|---|
| 5,590,292 A | 12/1996 | Wooten | |
| 5,687,388 A | 11/1997 | Wooten | |
| 6,112,129 A * | 8/2000 | Nagaraj et al. | 700/94 |
| 6,195,718 B1 * | 2/2001 | Hennessy et al. | 710/304 |
| 6,738,836 B1 | 5/2004 | Kessler | |
| 6,782,438 B1 | 8/2004 | Duncan | |
| 7,076,588 B2 | 7/2006 | Benson | |
| 7,085,967 B2 * | 8/2006 | Elfering et al. | 714/52 |
| 7,089,466 B2 * | 8/2006 | Odom et al. | 714/724 |
| 7,174,411 B1 * | 2/2007 | Ngai | 710/316 |
| 7,263,108 B2 * | 8/2007 | Kizhepat | 370/473 |
| 7,519,761 B2 * | 4/2009 | Gregg | 710/316 |
| 2004/0059537 A1 * | 3/2004 | McIntosh et al. | 702/120 |
| 2004/0168008 A1 | 8/2004 | Benson | |
| 2004/0177198 A1 | 9/2004 | Benson | |
| 2004/0225816 A1 | 11/2004 | Leigh | |
| 2005/0132178 A1 * | 6/2005 | Balasubramanian | 713/1 |
| 2006/0232295 A1 * | 10/2006 | Agrawal et al. | 326/38 |
| 2007/0195761 A1 * | 8/2007 | Tatar et al. | 370/389 |
| 2008/0222310 A1 * | 9/2008 | Karstens | 710/2 |

* cited by examiner

*Primary Examiner* — Henry Tsai
*Assistant Examiner* — Elias Mamo

(57) ABSTRACT

In accordance with the present technique, a system and method for configuring pins of an input/output (I/O) card in a host system are provided. The method includes reading configuration information from a card field replaceable unit memory and reading system configuration information from a system field replaceable unit memory. Additionally, the method includes configuring pins of a system logic of the host system to be compatible with the I/O device of the I/O card, and configuring pins of an I/O device on the I/O card to in turn configure the pins of the I/O card with a configuration setting compatible with the host system.

20 Claims, 6 Drawing Sheets

RECONFIGURABLE I/O CARD PINS

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Computer systems are used in nearly every business, home and school to increase productivity, enhance education, provide entertainment, and to facilitate communication, among other things. With the wide variety of uses, it is not surprising that a wide variety of computer hardware and software is available to customize computers according to the desires and needs of those using the computers. One hardware device, in particular, that allows for the customization of a computer system is an input/output (I/O) card and computer systems may be configured to receive one or more I/O cards. The I/O cards may be configured to operate as network interface cards, storage controller cards, or a graphics cards, for example.

A host interface allows an I/O card to communicate with a computer. In recent years, the peripheral component interconnect express (PCIe) interface has become the de facto standard host interface for I/O cards. PCIe is a point-to-point protocol, as opposed to a bus protocol, meaning each I/O card has a dedicated communication path with the host chipset. When a computer's system board is designed, the host interface from the system board's chipset are permanently allocated to all the I/O card slots within that system. The permanent allocation of the host interface may limit the use of the chipset's bandwidth when an I/O card not specifically designed for the system is placed in a slot. In order for the I/O card slots to be more versatile, i.e., to support a myriad of I/O cards, the I/O card slots need to be as high bandwidth as possible. Conventionally, in order to make a particular I/O card compatible with a particular system, pin groups are added to the I/O card.

DETAILED DESCRIPTION OF SPECIFIC EMBODIMENTS

One or more example embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In accordance with the present techniques, a system and method to flexibly assign pins of an I/O card are provided. Specifically, an I/O card may be provided with a set number of pin groups and each group of pins of the I/O card may be reconfigured. Stated differently, the function definitions or the direction of information flow on a group of pins may be flexibly assigned in order to allow an I/O card to be usable in a wide range of I/O card slots in the same system or in different systems. The pin reconfiguration includes reconfiguring components or devices, such as a system logic and an I/O device, so that they may communicate over their pins. Due to the configuration of the components or devices that communicate over the pins, the pins may be flexibly assigned or reconfigured to enable proper operation of the components or devices and proper communication between them. Additionally, as will be discussed in greater detail below, embodiments of the present invention may allow for increased utilization of host bandwidth by providing additional host interface I/O card slots.

The present techniques include providing a card field replaceable unit (FRU) memory on the I/O card which is configured to communicate with a system controller in a host computer system. The system controller reads information stored on the card FRU memory to determine the functionality of the I/O card, including the pin usage and bandwidth requirements, for example. The system controller also determines the system configuration by reading a system FRU memory. The system controller then configures the I/O device on the I/O card and reassigns the pins to match the capabilities and the bandwidth provided by the host via the I/O slot into which the I/O card is inserted. Implementation of the present techniques, therefore, allows for one I/O card to be designed to operate in a variety of different systems. The techniques also allow for higher bandwidth host interface using a minimum number of pins and more external interfaces of the I/O card may be routed back to the system board, as will be discussed in greater detail below with reference to the figures.

Figure 1:
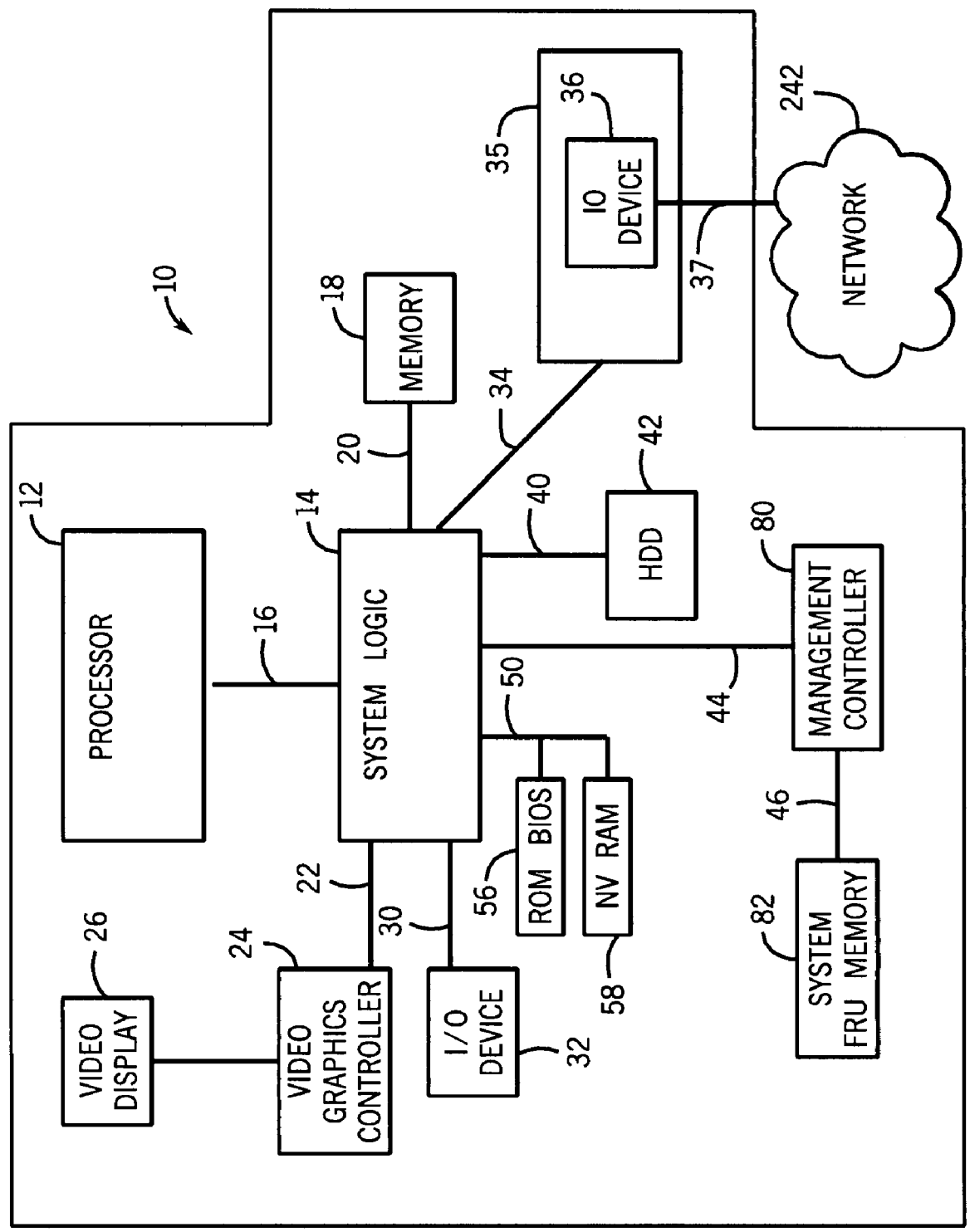
FIG. 1 is a block diagram of a computer system in accordance with an exemplary embodiment of the present invention.

Turning to the figures and referring initially to FIG. 1, a block diagram illustrating an exemplary computer system in accordance with embodiments of the present invention is shown and generally referred to by the reference numeral 10.

The block diagram of the computer system 10 is given for purposes of illustration only, as computer systems in which the present teachings are applicable may include additional components or a subset of the components illustrated in FIG. 1. In particular, certain embodiments discussed in greater detail below may be particularly useful in a blade server environment. As such, although FIG. 1 is illustrated as a stand-alone computer system, it should be understood that the general principles and teachings disclosed herein may be applied in a wide variety of computer architectures, topologies and configurations.

The computer system 10 may include processor 12, which may be an Intel® Core™ 2 Duo processor, for example. In addition, a system logic 14, such as an Intel® chipset, for example, may be connected to the processor 12 via a processor bus 16. The system logic 14 may be configured to manage a variety of functions on behalf of the processor 12 and may include a northbridge, a southbridge and a PCIe switch, in accordance with current practice.

The system logic 14 may be connected to a system memory 18 via memory bus 20. The system memory 18 may comprise static random access memory (SRAM), dynamic random access memory (DRAM) or other suitable memories. A peripheral component interconnect express (PCIe) link 22 may connect the system logic 14 to a video graphics controller 24 to provide signals that produce a display image on a video display 26. Similarly, a PCIe link 30 may connect the system logic 14 to an I/O device 32.

Additionally, a PCIe link 34 may be used to connect the system logic 14 with an I/O card 35 having an I/O device 36. As will be discussed below a system board having the processor 12 and system logic 14, and the I/O card 35 may be configured to couple the I/O device 36 with the system logic 14 via the PCIe link 34. For example, the system board may provide connectors, such as I/O slots, to receive the I/O card 35 and the I/O card may provide pins to couple with the system board connectors. As illustrated, the I/O device 36 may be configured as a network interface card, and may interconnect with a network 242 via a network link 37. The network link 37 may be coupled to an external connector on the I/O card 35 so that a network cable, or the like, may be used to connect into the network 242. Alternatively, the I/O card 35 may be configured to provide a wireless connection into the network 242.

The system logic 14 may also be configured to use other communication buses to interconnect with other devices. For example, the system logic 14 may communicate over a bus 40 with a hard disk drive 42. The bus 40 may be a small computer system interconnect (SCSI) bus, advance technology attachment (ATA) bus, or serial AT attachment (SATA) bus, for example. The system logic 14 may communicate over a PCI or PCI-X bus to access system devices such as a read only memory basic input/output system (ROM BIOS) 56, and a non-volatile memory 58 (such as flash memory or the like).

Additionally, a management controller 80, coupled via interface 46 to a system FRU memory 82, may be communicatively coupled with the system logic 14 via a communication interface 44. As will be discussed in greater detail below the management controller 80 determines the system configuration by reading the system FRU memory 82. The management controller 80 then configures any I/O cards coupled into the system so that they may operate within the system 10.

The use of PCIe links 22 and 30 provide a significant advantage over the alternative communication buses and host interfaces in terms of performance. The PCIe links are made up of lanes capable of rates up to 2.5 gigabits per second per lane or higher. The lanes include unidirectional pairs of serial, point-to-point connections. While at least one lane (x1 link) is required, the PCIe devices may optionally support up to 32 lanes, as the PCIe specification defines x1, x2, x4, x8, x16 and x32 link widths. Servers generally have higher I/O device connection point requirements than desktop or notebook computers and, as such, servers may have more PCIe links having higher lane counts when compared to other computer system configurations.

Figure 2:
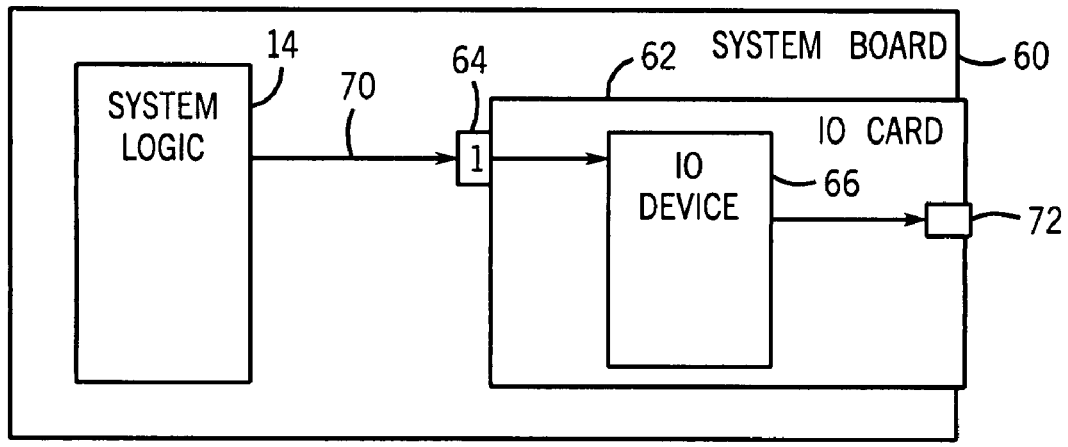
FIG. 2 illustrates a conventional system board with an I/O card having a group of pins for a host interface.

A block diagram of a conventional system board 60 and I/O card 62 is illustrated in FIG. 2. The system board 60 may be a mother board of a personal computer system or a board of a blade server, for example. The system board 60 has the system logic 14, which, as described above, may be coupled to the processor 12 (FIG. 1). As mentioned above, I/O cards allow users to customize their computer systems for different applications having I/O requirements and, as such, the system board 60 may be configured to provide one or more input/output (I/O) slots to accept I/O cards, such as I/O card 62.

The I/O card 62 has a pin group 64 which allows for the I/O device 66 of the I/O card 62 to communicatively couple with system logic 14 of the system board 60. The pin group 64 may represent a group of pins supporting one or more lanes of a PCIe host interface. As such, the link 70 may represent one or more lanes of the host interface. The I/O card 62 may also have one or more external interfaces, such as Ethernet for data communications, Fibre Channel for storage networking, or Serial Attached SCSI (SAS) for storage devices, for example. The external interface may be exposed directly on the I/O card with connectors, such as external connector 72 which allows for cables to be attached directly to the I/O card 62. Alternatively, some I/O cards are intended to be used internal to a system and external interface signals are routed onto the system board before they are routed to external interfaces, which may have pin groups similar to PCIe pin groups. These types of I/O cards are referred to as mezzanine cards, and are typically used in a server blade configuration. Examples of I/O cards and system boards configured for such use are discussed in greater detail below.

An I/O card's host interface and external interface can be different sizes. Higher performance I/O cards use a wider host interface than lower performance I/O cards. The wider host interface provides a higher bandwidth to the I/O device on an I/O card. As such, in order to provide increased bandwidth for the I/O device 66 of the I/O card 62, the system board 60 would need to be designed to support additional lanes. Additional pins may be provided on the I/O card 62 to support a higher bandwidth. However, only the highest mutually supported bandwidth between the I/O card 62 and the system logic 14 is utilized in a conventional system. This often results in inefficient or improper operation of the system logic 14 and/or the I/O device 66. If a low bandwidth I/O device is inserted into an I/O slot configured to support a high bandwidth I/O device, the bandwidth dedicated to those lanes may go unused and the system logic 14 may be underutilized. Alternatively, if a high bandwidth I/O device is inserted into an I/O slot providing lower bandwidth, having only one lane, for example, the I/O device may not function properly because of the lack of available bandwidth.

As mentioned above, conventionally, in order to make a particular I/O card compatible with a particular system board, designers simply added pin groups to the I/O card. The additional pin groups could then be used as host interface pins or external interface pins depending on the particular compatibility issues between the I/O card and the particular system board. However, even with the additional pin groups, the I/O card may not be compatible with yet another system board.

Figure 3:
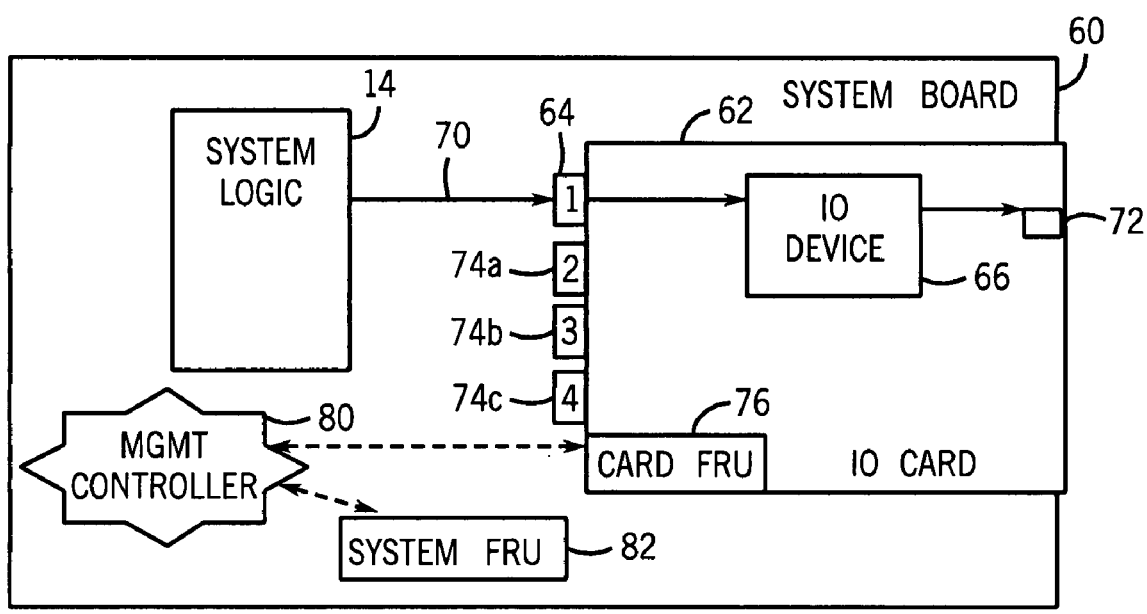
FIG. 3 is a block diagram of a system board and an I/O card having reconfigurable pins in accordance with an embodiment of the present invention.

As an alternative to the conventional technique, an I/O card may be configured to provide a set of reconfigurable pin groups such as those on I/O card 62 illustrated in FIG. 3. The I/O card 62 is shown with a system board 60 in accordance with an embodiment of the present invention as having additional pin groups 74a-c. The I/O card 62 is also provided with a card field replaceable unit (FRU) memory 76. The card FRU memory 76 may be a storage device such as an electrically erasable programmable read-only memory (EEPROM), a Flash memory, or non-volatile random access memory (NVRAM), for example. The card FRU memory 76 stores information about the I/O device 66 of the I/O card 62. For example, the card FRU memory 76 may store information such as the number of pins in pin groups 64, and 74a-c provided for the host interface, as well as the number of external connectors 72. Additionally, the card FRU memory 76 may store information such as the maximum bandwidth that the I/O device 66 may require as well as the minimum bandwidth required for proper operation of the I/O device 66.

The information stored on the card FRU memory 76 may be communicated to the system board 60. Specifically, as illustrated, the system board 60 may be modified to include a management controller 80 configured to be communicatively coupled with the card FRU memory 76 when the I/O card 62 is inserted into an I/O slot of the system board 60. The management controller 80 may be a dedicated processor, an ASIC, or a processor already existing on the system board 60. For example, in one embodiment, the management controller 80 may be an integrated lights-out (iLo) baseband management controller, such as those used in Hewlett Packard™ server products, for example. Generally, the baseband controllers are configured to monitor the operating temperature, the turn-on and turn-off, etc. of the system board 60, but may also be used to configure the pin groups of the I/O card 62.

In addition to being communicatively coupled with the card FRU memory 76, the management controller 80 may be communicatively coupled with a system FRU memory 82. The system FRU memory 82 may store information regarding the I/O capabilities of the system logic 14 and the system board 60. For example, the system FRU memory 82 may store information such as the number of lanes provided to a particular I/O slot.

Using the information from the card FRU memory 76 and the system FRU memory 82, the management controller 80 configures the additional pin groups 74a-c of the I/O card 62 to be compatible with the I/O capabilities of the system board 60. The management controller 80 may configure the I/O card 62 via the system logic 14 and the link 70 or, alternatively, yet another additional pin group may be provided on the I/O card to facilitate communication of the configuration information to the I/O card 62. The management controller 80 may receive the configuration information under stand-by power before the system is powered-on and setup the card FRU memory 76 and the system FRU memory 82 so that when the system is booted the I/O devices will be appropriately configured. Stated differently, the management controller 80 writes configuration information to the card FRU memory 76 so that when power is supplied to the system, and consequently to the I/O device 66, the I/O device 66 may read the card FRU memory 76 and be configured according to the configuration information stored thereon. Alternatively, if the I/O device 66 and the I/O card 62 are configured to be hot-pluggable and the system is already operating, after reading the configuration information from the card FRU memory 76, the management controller 80 may configure the I/O device directly via the system logic 14.

Figure 4:
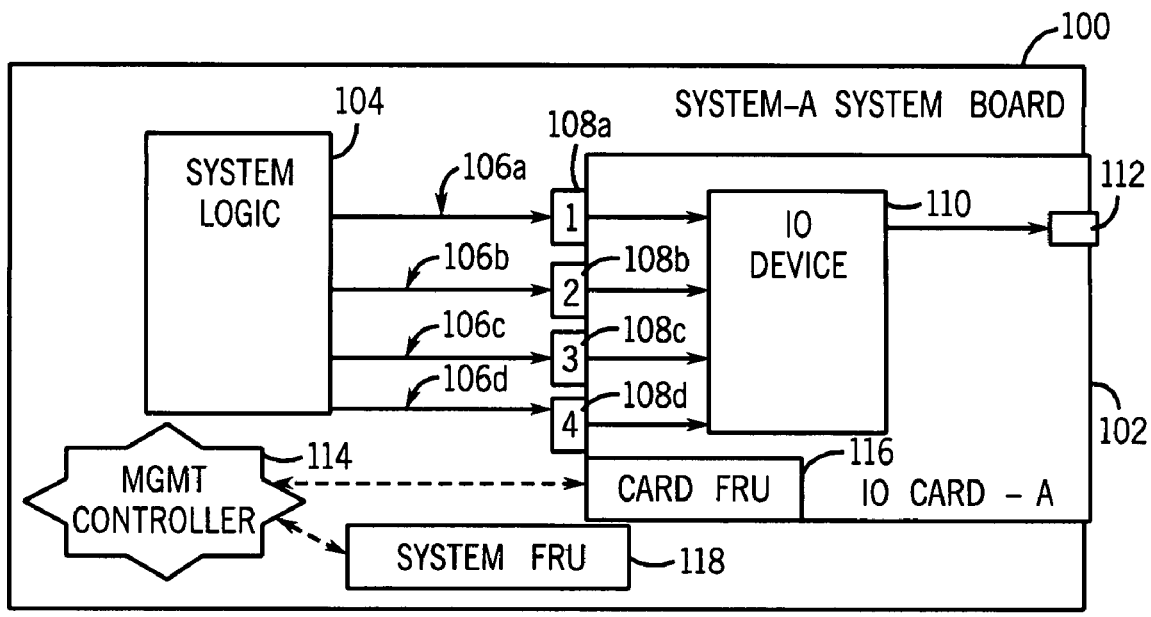
FIG. 4 illustrates a system board-A with an I/O card-A having reconfigurable pins in accordance with an alternative embodiment of the present invention.
Figure 5:
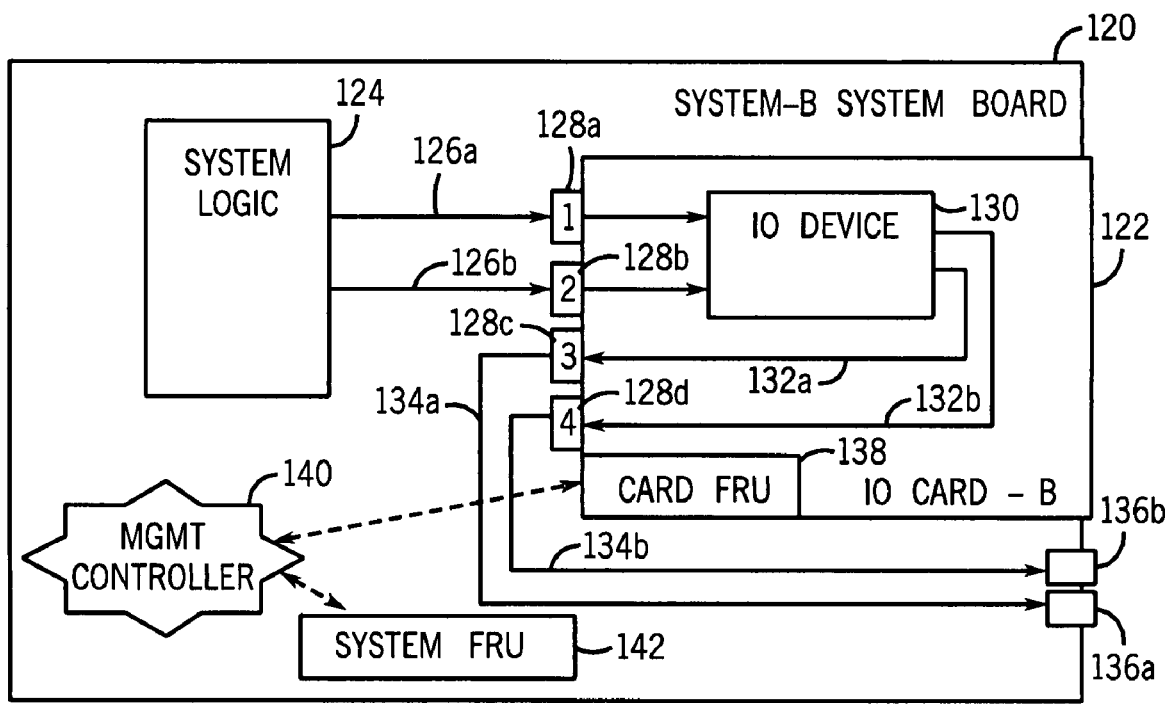
FIG. 5 illustrates a mezzanine configuration for a system board-B with an I/O card-B in accordance with yet another embodiment of the present invention.
Figure 6:
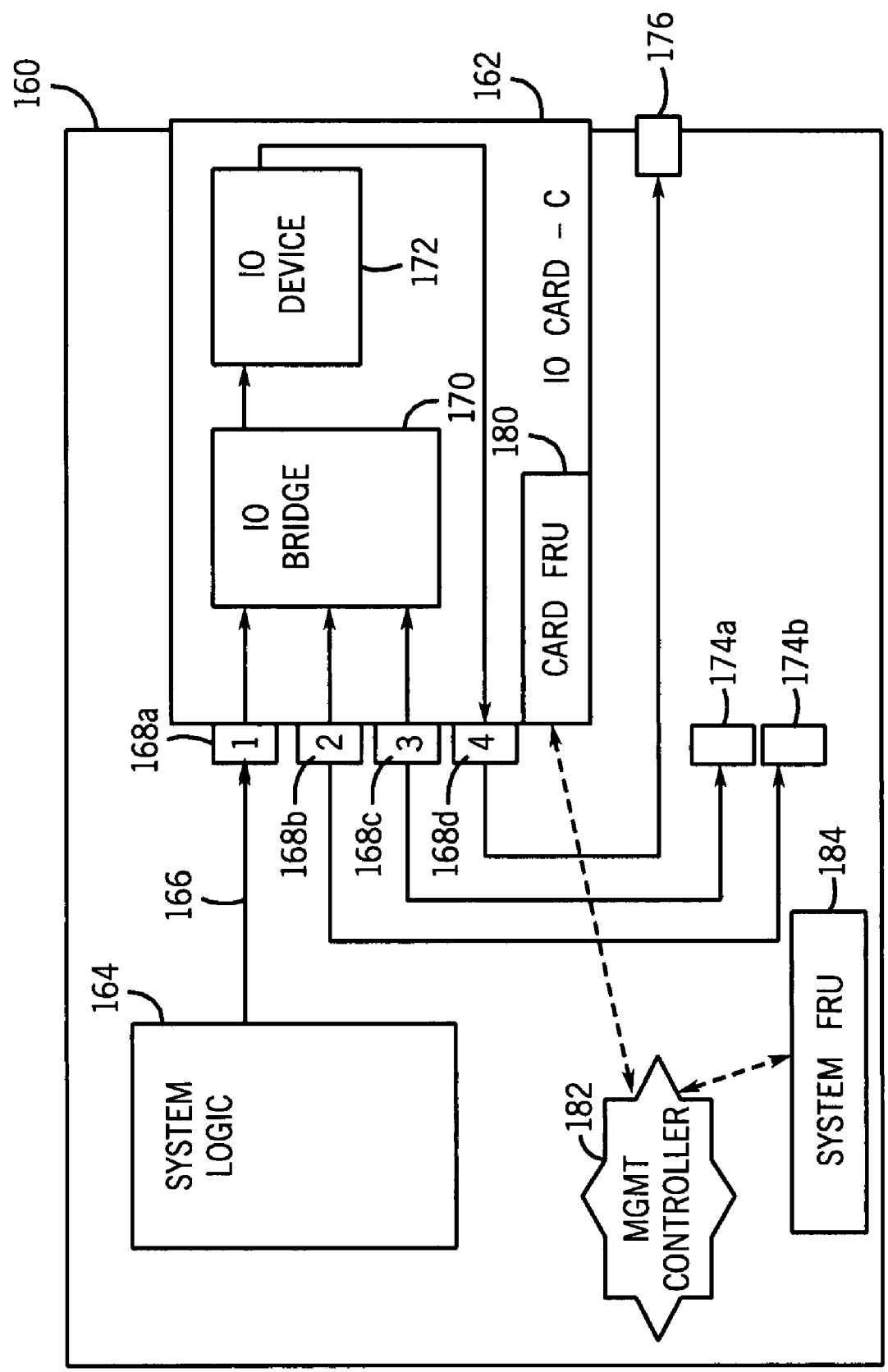
FIG. 6 illustrates a system board-C with an I/O card-C in accordance with another alternative embodiment of the present invention.

The following discussion describes a variety of alternative embodiments in which pins on an I/O card are reconfigurable in accordance with the present techniques. As mentioned above, when designing a system board, decisions are made concerning the number slots that are to be provided and the bandwidth that will be provided to those slots via a host interface. As such, typically, system boards and I/O cards are designed to specifically be compatible as a particular set. In FIGS. 4 through 6 various embodiments are illustrated where the I/O card has been designed for a particular system board. For example, FIG. 4 illustrates a system-A board 100 and an I/O card-A 102. The system-A board 100 has a system logic 104 which provides a host interface for the I/O card-A 102 via links 106a-d. Each link 106a-d may have a width of x4 resulting in a total host I/O interface width of x16. The links 106a-d are coupled to pin groups 108a-d of the I/O card-A 102. An I/O device 110 of the I/O card-A 102 is coupled to the system logic 104 via the pin groups 108a-d. The I/O device 110 may be coupled to an external interface 112.

A management controller 114 is provided on the system-A board 100. As discussed above, the management controller 114 may configure the pin groups 108a-d of the I/O card-A 102. To do so, the management controller is communicatively coupled with a card FRU memory 116 and a system FRU memory 118. The card FRU memory 116 provides the management controller 114 with I/O capability information from the I/O card 102 while the system FRU memory 118 provides I/O configuration information of the system-A board. Upon receiving the information, the management controller 114 configures the pin groups 108a-d to operate with the system-A board 100. As illustrated, the I/O card-A 102 has been designed to operate with the system-A board 100 and each of the pins 108a-d are configured to be used for the host I/O interface with links 106a-d.

A system-B board 120 and an I/O card-B 122 designed in a mezzanine configuration are illustrated in FIG. 5. The I/O card-B 122 is coupled to a system logic 124 via links 126a-b and pin groups 128a-b. The links 126a-b may each have a x4 width resulting in a total host interface width of x8. In a mezzanine configuration the external interface of I/O card-B 122 is via the system-B board 120. Specifically, traces 132a-b on the I/O card-B 122 are coupled to traces 134a-b on the system-B board 120 via pin groups 128c-d, respectively. The traces 134a-b are coupled with the external connectors 136a-b. The mezzanine configuration is commonly implemented in blade servers due in part to the size constraints associated with the blade server configuration.

The I/O card-B 122 has a card FRU memory 138 which is communicatively coupled with a management controller 140. The card FRU memory 138 stores I/O configuration information, such as the configuration of pin groups 128a-d and bandwidth information for the I/O device 130, for example. The information is provided to the management controller 140. A system FRU memory 142 is also coupled to the management controller 140 and provides system configuration information to the management controller. For example, the system FRU memory 142 may provide information indicating the system B board 120 has external connections 136a-b. After receiving the information from the card FRU memory 138 and the system FRU memory 142, the management controller 140 configures the pin groups 128a-d so that pin groups 128a-b may be used with the host interface links 126a-b and pin groups 128c-d may be used with the external interface and external connectors 136a-b.

As illustrated, the management controllers 114 and 140 of FIGS. 4 and 5, respectively, configure the pin groups 108a-d and 128a-d differently based on the information received from card FRU memories 116 and 138 and system FRU memories 118 and 142. Specifically, pin groups 128c-d in FIG. 5 are configured for use with the external interface, while pin groups 108c-d of FIG. 4 are configured for use with the host interface. This is possible because the host interface, i.e., PCIe interface, and external interfaces have similar pin usage and electrical signal characteristics. Table 1 lists several possible host interfaces and external interfaces along with their pin usage and signal characteristics. As shown in Table 1, the different interfaces use between one and four lanes and between 4 and 16 wires or pins. As such, the same group of pins can be used for different interface protocols as long as the pins are used for only one protocol at a time. This is particularly useful in a mezzanine configuration. The embodiments discussed below illustrate various alternative configurations of mezzanine boards used in conjunction with the reconfigurable pins of I/O cards.

TABLE 1

| Interconnect | Lanes | # Wires or Pins | BW Per Lane | | Aggregate BW | |
|---|---|---|---|---|---|---|
| GbE | 1x | 4 | 1.25 | Gbps | 1.25 | Gbps |
| 10 GbE (10G-Base-KX4) | 4x | 16 | 3.125 | Gbps | 12.5 | Gbps |
| 10 GbE (10G-Base-KR) | 1x | 4 | 10.3 | Gbps | 10.3 | Gbps |
| FC (1, 2, 4, 8 Gb) | 1x | 4 | 1, 2, 4, 8 | Gbps | 1, 2, 4, 8 | Gbps |
| SAS | 1x | 4 | 3 | Gbps | 3 | Gbps |
| IB | 4x | 16 | 2.5 | Gbps | 10 | Gbps |
| IB DDR | 4x | 16 | 5 | Gbps | 20 | Gbps |
| IB QDR | 4x | 16 | 10 | Gbps | 40 | Gbps |
| PCI Express | 1x, 2x, 4x | 4, 8, 16 | 2.5 | Gbps | 2.5, 5, 10 | Gbps |
| PCI Express (gen2) | 1x, 2x, 4x | 4, 8, 16 | 5 | Gbps | 5, 10, 20 | Gbps |

Referring to FIG. 6, a system-C board 160 is illustrated with an I/O card-C 162. The I/O card-C 162 is communicatively coupled with system logic 164 via host interface link 166 and pin 168a. The I/O card-C 162 has an I/O bridge 170 which may be configured to provide a host interface connection to an I/O device 172 on the I/O card-C 162, as well as to I/O connectors 174a-b located on the system-C board 160 via pin groups 168b-c. Additionally, the I/O device 172 may use the system-C board 160 to access an external connector 176 via pin group 168d. As such, a card FRU memory 180 is configured to provide I/O configuration information to a management controller 182, including information regarding the I/O bridge 170 being configured to provide a host interface connection via pin groups 168b-c. A system FRU memory 184 may be configured to provide system I/O configuration information to the management controller 182. Specifically, the system FRU memory 184 may indicate that I/O slots 174a-b are provided on the system-C board 160. After receiving the I/O configuration information from the card FRU memory 180 and the system FRU memory 184, the management controller configures the pin groups 168a-d accordingly.

The I/O connectors 174a-b may be configured as I/O slots to allow for additional I/O cards to have an host interface on the system-C board 160. Thus, the I/O bridge 170 may facilitate multiplication of I/O slots, increasing the number of I/O cards that may be used with the system-C board 160. The I/O slot multiplication may be useful with I/O cards having low bandwidth requirements, such as 1 gigabit per second Ethernet, for example. With high-speed transceiver technology advances, the host bandwidth in modern servers will have abundant bandwidth to be fanned out through slot multiplication and still support the I/O device on the I/O card, such as I/O device 172, for example.

Figure 7:
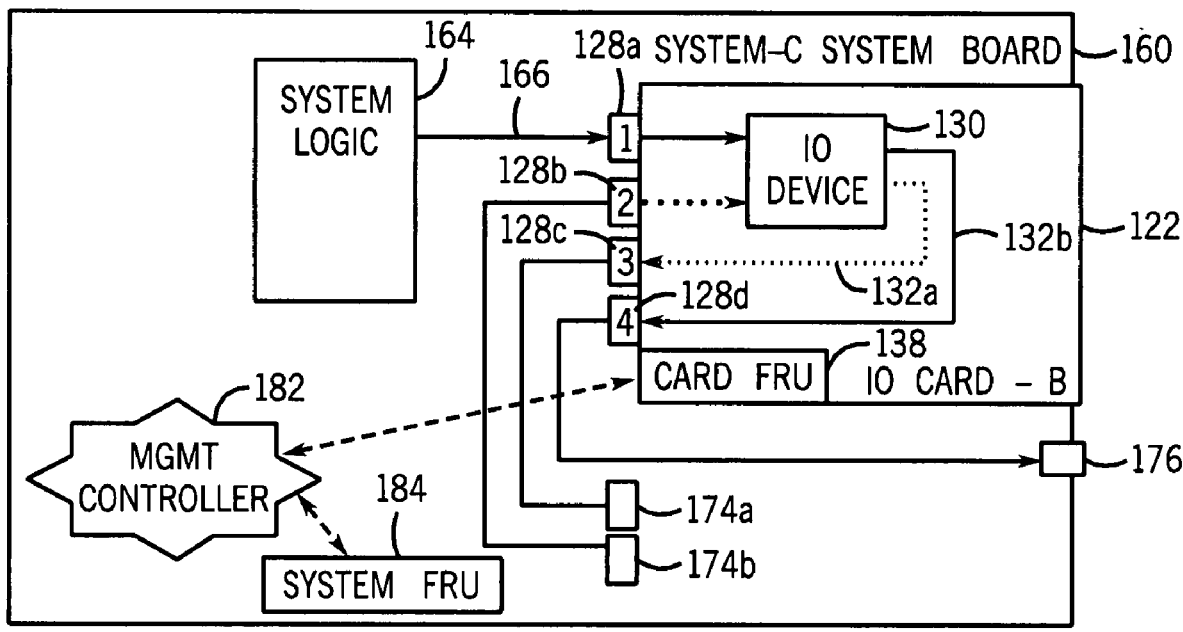
FIG. 7 illustrates the system board-C with I/O card-B in accordance with yet another embodiment of the present invention.

System boards and I/O cards are interchangeable and cross-compatible using the management controllers, card FRU memories and system FRU memories, as discussed above. Turning to FIG. 7, the system-C board 160 is shown with the I/O card-B 122. As with the previously described embodiments, the management controller 182 of the system-C board 160 reads the card FRU memory 138 to find the I/O configuration information of the I/O card-B 122 and reads system FRU memory 184 to find the I/O configuration information about the system-C board 160. The management controller 182 then configures the pin groups 128a-d so that I/O card-B 122 operates with the system board 160. Specifically, the management controller 182 indicates to the I/O card-B 122 that no host interface will be provided via pin 128b. Additionally, because pin group 128c is coupled to an I/O slot on the system board-C 160, the management controller 182 may indicate that the I/O device 130 should not use pin group 128c. As such, the management controller 182 configures the I/O card-B 122 to only use pin groups 128a and 128d.

In an alternative embodiment, the I/O device 130 of the I/O card-B may be designed to be reconfigurable to utilize one or both of the pin groups 128b-c. Specifically, the I/O device 130 may be reconfigured so that pin groups 128b-c may be used to fan out bandwidth via I/O slots 174a-b, effectively dividing the host bandwidth of pin group 128a between the pin groups 128a-c and the external interface provided via pin 128d. For example, the direction of pin group 128b can be reversed and pin group 128c can be a pass-thru, although that is beyond the scope of this invention. Regardless, any reconfiguration and allocation of bandwidth will depend on the particular bandwidth requirements of the I/O device 130. The management controller 182 may be configured the decision on bandwidth allocation based on the information provided from the card FRU memory 138 and the system FRU memory 184.

Figure 8:
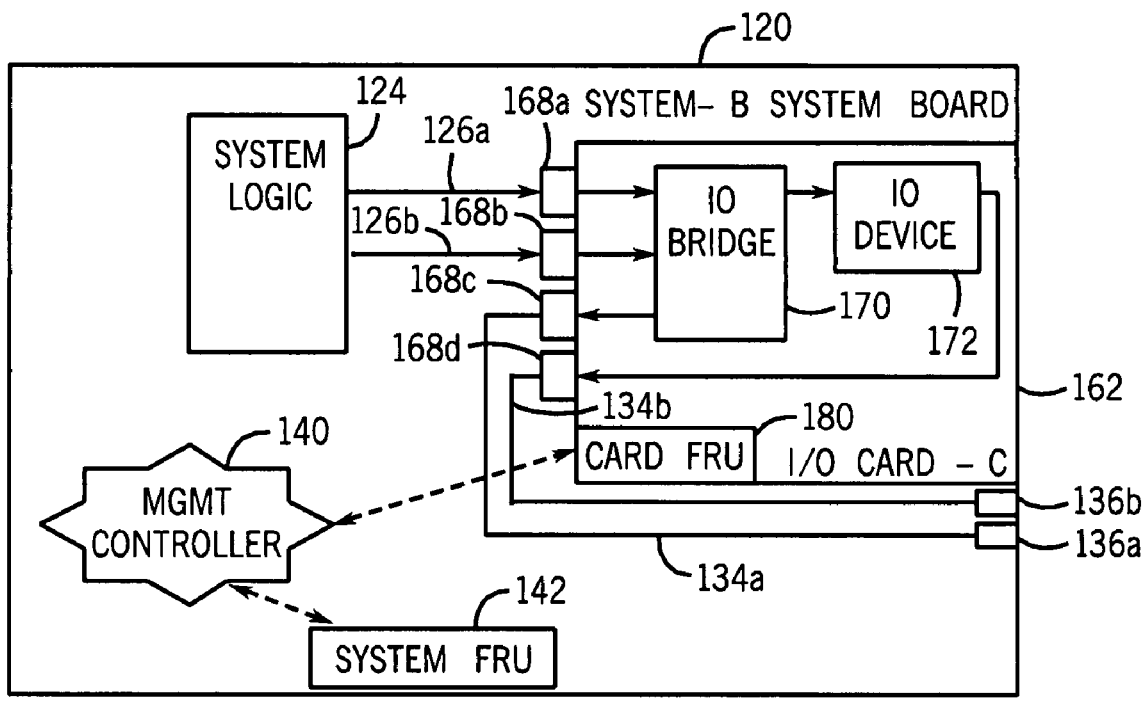
FIG. 8 illustrates the system board-B with the I/O card-C in accordance with an alternative embodiment of the present invention.

In yet another alternative embodiment, illustrated in FIG. 8, the I/O card-C 162 may be used with the system board-B 120. Here, the management controller may configure the I/O card-C 162 so that the pin 168b is used with the host I/O interface 126b, whereas when used with system board-C 160 (FIG. 6), the pin 168b was used for slot multiplication. The management controller 140 may be programmed to configure the I/O bridge 170 in a variety of different ways in order to utilize the additional bandwidth provided via pin 168b. For example, the I/O bridge 170 may provide additional bandwidth to the I/O device 172, while fanning out bandwidth to the connector 136a via the connector 168c.

As mentioned above, the mezzanine configuration is frequently used in conjunction with the blade server systems. In blade server systems, the system board may be a server and, as such, multiple system boards may be housed within a single enclosure. In accordance with an alternative embodiment of the present invention, the I/O slot multiplication may occur across system boards, i.e. across different blades within an enclosure.

Figure 9:
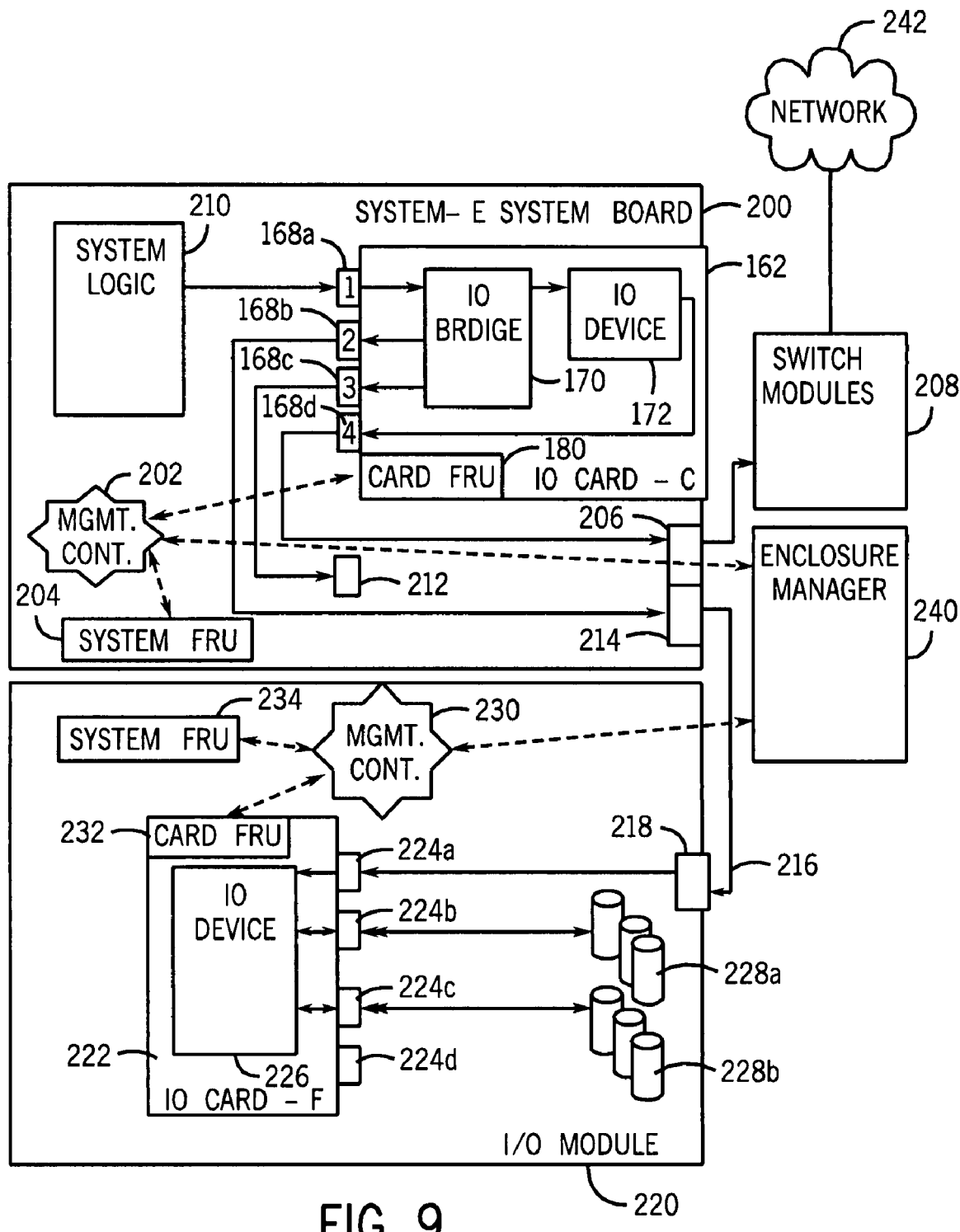
FIG. 9 illustrates a system board-E with the I/O card-C, wherein the system board-E is configured to couple with an I/O module located on a separate blade within a blade server enclosure in accordance with an embodiment of the present invention.

Referring to FIG. 9, a system-E board 200 is illustrated with the I/O card-C 162. The system-E board 200 has a management controller 202 which is communicatively coupled with the card FRU memory 180 of the I/O card-C 162 and a system FRU memory 204 of the system-E board 200. The system-E board 200 provides an external connector 206 to allow the I/O device 172 of the I/O card-C to communicate with switch modules 208 of the enclosure. Switch module 208 provides an aggregation point for the I/O devices, such as I/O device 172 in each server blade, for the server blades to communicate with one another, as well as provides external network connectivity via one or more external networks 242. The external networks 242 may be Ethernet, Fibre Channel, or InfiniBand network.

Additionally, the system-E board 200 provides for fan out of the system logic 210 bandwidth. Specifically, the system-E board 200 provides an additional I/O slot 212, where another I/O card may be inserted. The system-E board 200 also provides a backplane host interface connector 214. The backplane interface connector 214 may be coupled to a backplane trace 216 of an enclosure in which the system-E board 200 is placed to provide an interface to another system board or I/O module located in the same enclosure as the system-E board 200. For example, the backplane trace 216 may be coupled to a backplane interface connector 218 of the I/O module 220. The I/O module 220 may have a blade server form factor so that it fits within the enclosure The I/O module 220 may have an I/O card 222 which is coupled with the backplane interface connector 218 via pin 224a. The pin 224a provides bandwidth from the system logic 210 of system-E board 200 to an I/O device 226 of the I/O card 222. The I/O device 226 may be configured to communicate with storage devices 228a-b which may be located on the I/O module 220 via pins 224b-c.

A management controller 230 is provided on the I/O module 220 to configure the I/O card 222 to operate with the I/O module 220. The management controller 230 is communicatively coupled with a card FRU memory 232 and a system FRU memory 234 so that it may receive I/O configuration information regarding the I/O card 222 and the I/O module 220. Once the management controller 230 receives I/O configuration information, it configures the pins of the I/O card 222 to properly operate.

Additionally, the management controller 230 is communicatively coupled with an enclosure manager 240, to which the management controller 202 of the system-E board 200 is also communicatively coupled. Each management controller 202 and 230 provides I/O configuration information regarding the system board to which they respectively belong to the enclosure manager 240. The enclosure manager 240 may then permit I/O communications between the system-E board 200 and the I/O module 220 via the backplane 216. As such, the management controllers 202 and 230 in conjunction with the enclosure manager 240 provide inter- and intra-board compatibility for I/O communications.

As illustrated, therefore, an I/O card and I/O slot connector pins can be reconfigured to maximize the use of the system logic bandwidth when the I/O card and system board have at least one common configurable pin assignment. In situations where the I/O card and system board do not match, the I/O card operates without any harm to either the card or board. Thus, the I/O cards, although designed for use with a particular board, may be used with any system board.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system comprising:
a processor located on a system board;
a system logic coupled to the processor;
an input/output (I/O) connector coupled to the system logic via a host interface and configured to couple to an I/O card, the I/O card comprising a card field replaceable unit (FRU) memory and pins, the pins being configurable to allow for communication across the host interface or an external interface; and
a management controller adapted to read the card FRU memory and a system FRU memory, the system FRU memory being located on the system board while the system is in a stand-by mode, the system FRU memory being separate from a main memory of the system, the card FRU memory storing configuration information for the I/O card and the system FRU memory storing configuration information for the system, where the management controller is adapted to configure the pins of the I/O card to operate with the system when the system is booted.

2. The system of claim 1 where the host interface comprises a peripheral component interface express (PCIe).

3. The system of claim 1 where the I/O card comprises an I/O device, the I/O device having a host I/O interface and an external I/O interface, the host I/O interface being communicatively coupled to the system logic and the external I/O interface being communicatively coupled with a device that provides I/O input.

4. The system of claim 3 where the I/O card is configured as a mezzanine board and the external I/O interface is provided via the system board.

5. The system of claim 1 where the I/O card comprises a bridge coupled to the pins and configured to divide bandwidth between the pins and an I/O device located on the I/O card.

6. The system of claim 1 where the management controller is communicatively coupled to an enclosure manager of an enclosure in which the system is located, the management controller providing system configuration information to the enclosure manager.

7. The system of claim 6 where the system is configured to provide host I/O bandwidth to an I/O module located within the enclosure, the enclosure manager configuring the I/O module and the system based on the configuration information received from the management controller.

8. An input/output (I/O) card comprising:
an input/output (I/O) device;
a plurality of pin groups configured to enable the (I/O) to communicate with a system logic located on a system board, where the system board comprises a system field replaceable unit (FRU) memory configured to store information about the system logic, the system FRU memory being separate from a main memory of the system board; and
a card FRU memory configured to store information about the I/O device, where a management controller is configured to control configuration of the plurality of pin groups based, at least in part on, the information about the system logic and the information about the I/O device.

9. The I/O card of claim 8, where an external interface for the I/O device is provided on the I/O card.

10. The I/O card of claim 8, where an external interface for the I/O device is provided on the system board and at least one of the plurality of pin groups is used to route signals to the external interface.

11. The I/O card of claim 10, where the external interface is configured to provide (I/O) slots on the system board.

12. The I/O card of claim 8, where the I/O device is a storage controller or a graphic controller and where the I/O device provides a network interface controller.

13. A method, comprising:
  reading a card configuration information from a card field replaceable unit (FRU) memory on an input/output (I/O) card positioned in an I/O slot of a host system;
  reading a system configuration information from a system FRU memory located on a system board of the host system, said system FRU memory being separate from a main memory of said host system;
  determining a pin configuration for a pin set based, at least in part, on the card configuration information and the system configuration information, where the pin configuration facilitates the I/O card to be compatible with I/O capabilities of the system board; and
  controlling the pin set to operate according to the pin configuration.

14. The system of claim 2, where the I/O card comprises a bridge coupled to the pins and configured to divide bandwidth between the pins and an I/O device located on the I/O card.

15. The I/O card of claim 8, where the system board is a mother board of a personal computer system.

16. The I/O card of claim 8, where the system board is a board of a blade server.

17. The system of claim 1, where the management controller is configured to write the configuration information on the card FRU;
  where an I/O device located on the I/O card reads the configuration information in response to the I/O device receiving power; and
  where the I/O device configures the pins so the I/O card is compatible with I/O capabilities of the system board.

18. The I/O card of claim 8, where the information about the system logic includes I/O capabilities for the system logic and I/O capabilities for the system board; and
  where the information about the I/O device designates a minimum bandwidth for proper operation of the I/O device and a maximum bandwidth for the I/O device.

19. The I/O card of claim 8, where the management controller is configured to write the configuration information on the card FRU;
  where the I/O device is caused to read the configuration information in response to receiving power;
  where the I/O device configures the plurality of pin groups so the I/O card is compatible with I/O capabilities of the system board.

20. The system of claim 13, where controlling the pin set to operate comprises:
  writing the pin configuration on the card FRU;
  reading the pin configuration from the card FRU; and
  configuring the pin set based, at least in part, on the pin configuration read from the card FRU.

* * * * *

UNITED STATES PATENT AND TRADEMARK OFFICE
CERTIFICATE OF CORRECTION

PATENT NO.       : 8,037,223 B2                                   Page 1 of 1
APPLICATION NO.  : 11/818204
DATED            : October 11, 2011
INVENTOR(S)      : Kevin B. Leigh et al.

It is certified that error appears in the above-identified patent and that said Letters Patent is hereby corrected as shown below:

In column 10, line 58, in Claim 8, delete "(I/O)" and insert -- (I/O) device --, therefor.

Signed and Sealed this
Third Day of July, 2012

David J. Kappos
*Director of the United States Patent and Trademark Office*